United States Patent
Nakajima et al.

[11] Patent Number: 5,519,519
[45] Date of Patent: May 21, 1996

[54] PRODUCTION METHOD FOR A POLYMER DISPERSED LIQUID CRYSTAL DISPLAY

[75] Inventors: Junji Nakajima, Katano; Hideaki Mochizuki, Osaka; Masao Yamamoto, Kishiwada; Hirofumi Wakemoto, Neyagawa, all of Japan

[73] Assignee: Matsushita Electric Industrial Co., Ltd., Japan

[21] Appl. No.: 101,767

[22] Filed: Aug. 4, 1993

[30] Foreign Application Priority Data

Aug. 11, 1992 [JP] Japan .................................. 4-213874

[51] Int. Cl.$^6$ ............................ G02F 1/1333; G02F 1/13
[52] U.S. Cl. ................................................. 359/52; 359/51
[58] Field of Search ........................................ 359/51, 52

[56] References Cited

U.S. PATENT DOCUMENTS

| | | | |
|---|---|---|---|
| 3,872,050 | 3/1975 | Benton et al. | 260/37 N |
| 4,818,070 | 4/1989 | Gunjima et al. | 350/334 |
| 4,938,568 | 7/1990 | Margerum et al. | 350/334 |
| 4,944,576 | 7/1990 | Lacker et al. | 350/334 |
| 5,011,624 | 4/1991 | Yamagishi et al. | 252/299.5 |
| 5,087,672 | 2/1992 | Babirad et al. | 525/329 |
| 5,096,282 | 3/1992 | Margerum et al. | 359/3 |
| 5,216,531 | 6/1993 | Hirai et al. | 359/52 |
| 5,242,616 | 9/1993 | Finkenzeller et al. | 252/299.01 |
| 5,286,408 | 2/1994 | Naemura et al. | 252/299.01 |
| 5,299,289 | 3/1994 | Omae et al. | 359/95 |

FOREIGN PATENT DOCUMENTS

| | | |
|---|---|---|
| 2-198365 | 8/1990 | Japan . |
| 4-106523 | 4/1992 | Japan . |
| 85/04262 | 9/1985 | WIPO . |

*Primary Examiner*—William L. Sikes
*Assistant Examiner*—Charles Miller
*Attorney, Agent, or Firm*—Wenderoth, Lind & Ponack

[57] ABSTRACT

The present invention provides a light-modulation element comprising at least: liquid crystal droplets having a particle size between 0.6 μm–2 μm, which have light-modulating functions to scatter light rays or transmit light rays and polymer matrix having an interstructure thickness of 0.5 μm or less between the liquid crystal droplets. The light-modulation element works to scatter light rays or transmit light rays by turning on a voltage or turning off a voltage. The light-modulation element is produced by a polymerization process and a mixing step to separate out liquid crystal phases in a polymer matrix.

23 Claims, 1 Drawing Sheet

PRODUCTION METHOD FOR A POLYMER DISPERSED LIQUID CRYSTAL DISPLAY

BACKGROUND OF THE INVENTION

1. The present invention relates to a light-modulation element composed of liquid crystals, which is applied to a display, a light-shutter and the like, and further to a production method thereof.

2. Description of the Invention

Recently a liquid crystal device of polymer-dispersion type constituted of a polymer-liquid crystal composite has been paid attention to as a display from the viewpoints:its easy production without an orientation treatment; a clear display achieved by use of no polarizing plate.

In general a liquid crystal device of polymer-dispersion type is produced by forming a liquid crystal-polymer composite composed of liquid crystals dispersed and kept in a polymer matrix between a pair of electrodes. The refractive index for ordinary rays in the liquid crystals is adjusted to be almost as same as that of the polymer matrix. In more detail, liquid crystal molecules are oriented almost parallel to an interface between the liquid crystal and the polymer matrix when no voltage is applied. Under such a state when light rays are put into the device perpendicularly to the substrate (electrode), the light rays scatter at the interface because the refractive index of polymer matrix is different from that of liquid crystal. When a voltage is applied between the electrodes, liquid crystal molecules are lined up in lines almost perpendicular to the electrodes in the case of nematic liquid crystal having positive dielectric anisotropy. In this case, the refractive index of polymer matrix becomes almost as same as the refractive index for ordinary ray in the liquid crystal, so that light rays transmit without scattering. The above characteristics make it possible to give a light-shuttering element.

However because a polarizing plate is not used, the contrast between turning on and turning off states is liable to be inferior compared with that of a conventional display which utilizes a polarizing plate. The contrast defined in this case is a ratio of light flux reaching a light-receiving portion under voltage-applied conditions to light flux reaching a light-receiving portion under no voltage-applied condition. As the contrast is higher, image quality becomes better.

A display mode of a liquid crystal device of polymer-dispersion type is controlled by alternating a light-scattering state and a light-transmitting state. These states depend on whether an electric field is formed or not. It is ideal that when no voltage is applied, all light rays scatter completely and almost no transmitted-light reaches a light-receiving portion. However in practice a number of light rays transmit without scattering. Therefore the improvement of light-scattering properties in the no voltage-applied state can lead to the improvement of performance of the display mode, resulting in high contrast and clear display.

A liquid crystal device of polymer-dispersion type is supposed to show three times the brightness of a conventional twisted nematic (referred to as "TN" hereinafter) mode in a voltage-applied state because a polarizing plate is not used. In practice such a sufficient brightness can not be often achieved because a polymeric material layer absorbs transmitted light and the refractive index of the liquid crystal is not coincident with that of the polymer matrix.

There is also a problem such that a liquid crystal device of the polymer-dispersion type requires a high driving voltage compared with a display device of TN mode. Therefore a driving IC available in the market can not be applied to the liquid crystal device of polymer-dispersion type.

In a conventional liquid crystal device of the polymer-dispersion type, light-scattering properties are determined by the difference between refractive index of liquid crystal and that of polymer. However, a large difference of refractive indexes can not be obtained practically from the viewpoint of physical properties of liquid crystal materials. Therefore scattering intensity is limited. High brightness can be achieved but contrast is much inferior to that of TN mode.

Further there is a problem such that polymeric materials absorb incident light in a voltage-applied state (i.e. a light transmitting state) to deteriorate light transmittance.

Since a conventional liquid crystal device of polymer-dispersion type has a high content of polymeric material in a polymer-liquid crystal composite, an effective voltage applied to the liquid crystal is low. Therefore a high driving voltage is applied. For example, liquid crystal devices of polymer-dispersion type are disclosed in prior arts such as Japanese Patent National Publication Sho 61-502128, Japanese Patent Laid-Open Hei 02-198365 and Japanese Patent Laid-Open Hei 04-106523 have respectively a high content of a polymeric material and require a driving voltage higher than 25 V. Therefore a driving IC available in the market can not drive the above liquid crystal device of polymer-dispersion type.

SUMMARY OF THE INVENTION

The object of the present invention is to provide a light-modulation element showing high brightness and high contrast which can be driven at a low voltage.

Another object of the present invention is to provide a production method of the above light-modulation element.

DETAILED DESCRIPTION OF THE INVENTION

The above objects can be achieved by filling a cell closely with liquid crystal droplets which can modulate light rays and by keeping and separating each liquid crystal droplet with polymeric layer thinner than wavelength of visible light.

The present invention provides a light-modulation element which does not require a high driving voltage caused by polymeric materials and is not affected adversely by light-absorption in a light-transmitting state.

Figure 1:
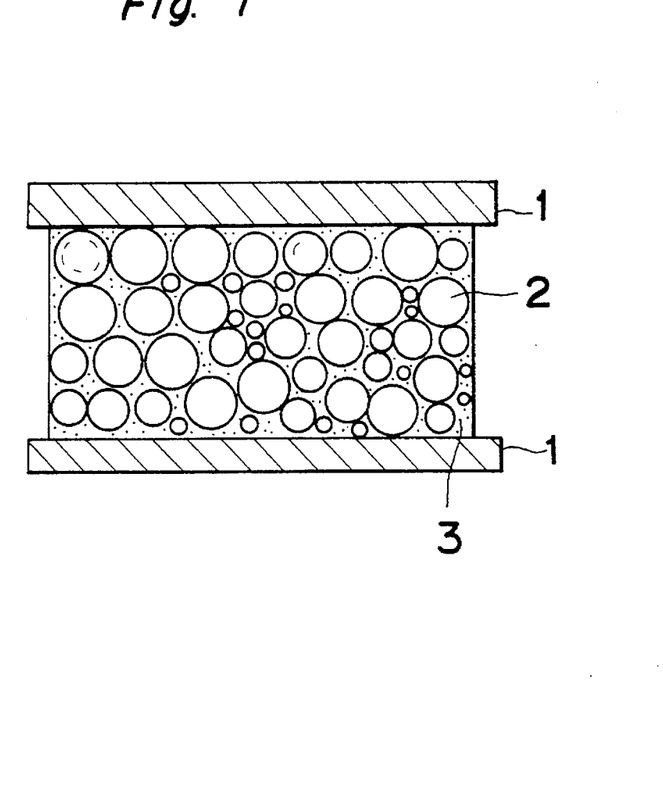
FIG. 1 is a sectional view of a light-modulation element of the present invention.

In a light-modulation element of the present invention, liquid crystal droplets having particle size of 0.6–2 μm are packed closely with thin polymer layer having a thickness of wavelength of visible light or less, preferably 0.5 μm or less, interposed between the liquid crystal droplets. The particle size of a liquid crystal droplet in the present application means a maximal length of the liquid crystal droplet in the direction of a sectional view (in another words, in the direction of thickness of the device) in the case of a device having a sectional structure as shown in FIG. 1. Therefore the droplet is not necessarily circular. The particle size of a flat shape is also defined as a maximal length in the direction of a sectional view of a liquid crystal droplet. The interstructure means a matrix composed of polymeric materials, and keeps liquid crystal droplets and separates the droplets from each other as shown in FIG. 1. The thickness of interstructure means a maximal distance between the droplets in the direction of sectional view in the case of a device having a sectional structure as shown in FIG. 1. The conventional technical problems in a conventional liquid crystal device of polymer-dispersion type can be solved by use of a device composed of liquid crystal droplets dispersed closely.

The liquid crystal device of the present invention has almost no influence from the polymeric material on light rays under light-transmittable conditions, being different from a conventional liquid crystal device of polymer-dispersion type. Incident light can pass through the device effectively as compared with a conventional liquid crystal device of polymer-dispersion type, resulting in high brightness.

In light-transmitting states, it is not necessary that a refractive index of polymer matrix is made as same as the refractive index for ordinary ray in liquid crystals as in a conventional liquid crystal device of polymer-dispersion type. Therefore the width of selection of materials is widened. The difference between the refractive index of liquid crystal droplets and that of the matrix is not so important as in a conventional device. Basically, distribution of directors in liquid crystal droplets effects change of direction of incident light to scatter light beams. As above mentioned, the inclusion of liquid crystal droplets as a light modulating member at high density makes it easy to form a liquid crystal device of polymer-dispersion type with high scattering properties compared with a conventional liquid crystal device of the polymer-dispersion type, with the result that high contrast can be realized.

Figure 2:
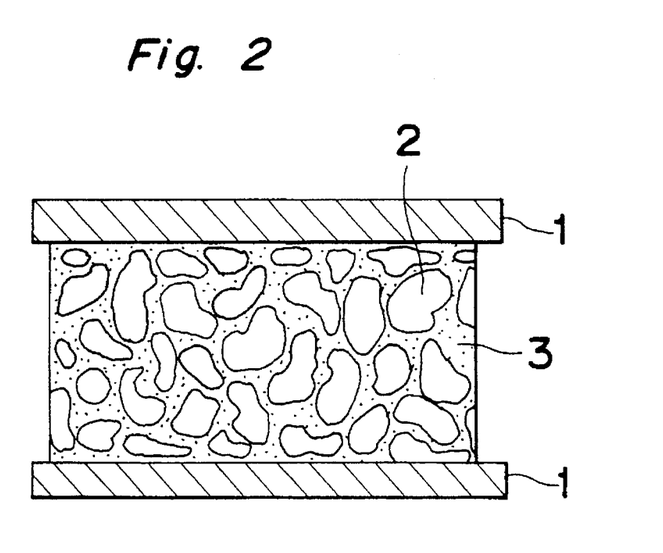
FIG. 2 is a sectional view of a light-modulation element of the present invention containing distorted liquid crystal droplets.

It has been also found that liquid crystal droplets are deformed partially to form shapes as shown in FIG. 2. Thereby, another effect has been found, i.e., that the direction of directors in liquid crystal droplets becomes very random to heighten scattering properties. Accordingly, it becomes possible to achieve much higher contrast.

In a liquid crystal device of polymer-dispersion type, the effective voltage applied to liquid crystal is low because of the existence of a polymer matrix, so that a high driving voltage is required. To the contrary, as a polymer-existing region is smaller than that of a conventional liquid crystal device of polymer-dispersion type, the applied voltage is almost provided for liquid crystal, so that a liquid crystal device of polymer-dispersion type of the present invention works at a small driving voltage compared with a conventional liquid crystal device of polymer-dispersion type.

Liquid crystal droplets are dispersed very closely in polymer matrix at an interval of wavelength of visible light or less. A liquid crystal device of the present invention has almost no influence of polymer matrix, for example light absorption of polymer matrix in comparison with a conventional liquid crystal device of polymer-dispersion type, so that incident light can pass through the device more effectively compared with a conventional liquid crystal device of the polymer-dispersion type, resulting in high brightness.

It is not necessary that the refractive index of polymer matrix be made the same as the refractive index for ordinary rays in liquid crystal as in a conventional liquid crystal of the polymer-dispersion type. Therefore the selection of polymeric materials is widened, so that freedom of material design is heightened.

Further, the defect in lowering of the effective voltage applied to liquid crystal, which is caused by division of applied voltage into two portions for the liquid crystal and polymer matrix, can be almost ignored, so that a liquid crystal device of the present invention can be driven at a low driving voltage compared with that of a conventional liquid crystal of polymer-dispersion type.

A conventional liquid crystal of polymer-dispersion type requires a large difference between an average refractive index of liquid crystal droplets and a refractive index of polymer matrix as an element to cause light-scattering in the no voltage-applied state, while a refractive index for ordinary rays in a liquid crystal need to be made identical to that of polymer-matrix in a voltage-applied state. Therefore, liquid crystal materials of fluorine series having relatively small anisotropy of refractive indexes, could not be used in spite of its reliability.

However in a liquid crystal device of polymer-dispersion type, the influence of the polymer matrix can be almost ignored and light-scattering and light-transmittance are controlled by the direction of directors in liquid crystal droplets. Therefore the difference of the refractive indexes is not so important. Accordingly liquid crystal formed of liquid crystal materials of fluorine series with a small refractive index can be used.

Liquid crystal droplets have been formed according to an emulsion method such as NCAP (Nematic Curvilinear Aligned Phase) as disclosed in Japanese Patent National Publication Sho 58-50131: This method, however, make it difficult to prepare liquid crystal droplets because the method may affect liquid crystal adversely by its use of water.

To the contrary, a liquid crystal device of polymer-dispersion type can be easily prepared according to a phase-separation method by photopolymerization. In this method, at least a liquid crystal material and a photopolymerizable material are mixed and the compatibilized mixture is irradiated to separate out liquid crystal in a polymer matrix. (Phase separation may be induced by use of a thermopolymerizable material). A photopolymerizable material is composed of polymerizable organic compounds such as a prepolymer and a monomer, and a photo-initiator. A polymeric compound, an inorganic filler and an organic additive may be added. A thermopolymerization initiator may be used. Suitable prepolymers and monomers are the ones having a vinyl group. Among those, acrylic compounds are preferable. Such a compound may be exemplified by monomers such as t-butyl acrylate, 2-ethylhexyl acrylate, 2-methoxyethyl acrylate, 2-phenoxyethyl acrylate, cyclohexyl acrylate, trimethoxypropane triacrylate, neopentylglycol diacrylate, 1,6-hexanediol diacrylate and trimethylolpropane triacrylate, polyfunctional acrylates made by Nippon Kayaku K.K. available as trade names such as HANDA, TC-110, HX-220 and HX-620, prepolymers available in the market such as polyester acrylate, epoxy acrylate, polyurethane acrylate and polyether acrylate, and a mixture thereof. Suitable photo-initiators are exemplified by benzoin methyl ether, benzoin isopropyl ether, benzoin isobutyl ether, benzophenone, benzylidene methyl ketal, 2,2-diethoxyacetophenone and 2-hydroxy-2-methyl-1-phenylpropane-1-one. In addition to the above radical polymerizable composition, a cation-polymerizable epoxy resin composition may be used.

The liquid crystal material used in the present invention is not limited insofar as it has both dielectric anisotropy which serves to control alignment of directors by voltage and anisotropy of refractive index. The liquid crystal material may be used singly or in combination as a composition. The anisotropy of refractive index may be positive or negative. The liquid crystal material may include an additive such as a coloring agent.

A liquid crystal device of the present invention can be used as a light-modulation element, which can be applied to a display, a light-shutter and the like.

A light-modulation element of the present invention can realize high light-scattering, high light-transmittance and low driving voltage. Thereby, it becomes possible to provide a device with high reliability by use of a liquid crystal material of fluorine series with small anisotropy of refractive index.

When a light-modulation element of the present invention is applied to a display device, high display properties can be achieved by means of an active matrix driving system in combination with a thin-film transistor. When a light-modulation element is used in combination with light-projecting system, a display of projecting type excellent in display properties can be obtained.

DESCRIPTION OF THE PREFERRED EMBODIMENT

Concrete examples of the present invention are explained hereinafter, but these are shown with no significance to restricting the embodiments of the invention.

EXAMPLE 1

A photopolymerizable material with 3 centipoise (referred to as "cp" hereinafter) comprising 2-ethylhexyl acrylate (made by Nakarai Tesuku K.K.) as a monomer of 7.41 wt %, Biscoat #3700 (made by Osaka Yuuki Kagaku Kogyo K.K.) as an oligomer of 11.21 wt % and Darocur1173 (made by Merck K.K.) as a photosetting initiator of 0.38 wt %, and ZLI4792 (composed of liquid crystal of fluorine series) (nematic-isotropic transition point (referred to as "N-I point" hereinafter) =92° C., $n_e$=1.573, $n_o$=1.479) (made by Merck Japan K.K.) as a liquid crystal material of 81.0 wt % were mixed to prepare a composition.

The composition was poured into the space formed with a spacer of 13.0 µm thickness interposed between a pair of glass substrates the whole surface of which was coated with ITO electrode. Temperature was kept at 94° C. to compatibilize the composition. Then, the temperature was lowered to 61° C. at a speed of 6° C./min. The temperature was maintained. At this time a part of the liquid crystal material was in a state of the nematic liquid crystal phase. The nematic liquid crystal phase and an isotropic liquid phase formed of the rest of liquid crystal materials and the polymeric materials were present at the same time. This mixed state was kept for 1 minute Then ultraviolet rays were applied (57 mW/cm², 5 seconds).

A sectional structure of the obtained device was observed by a scanning electron micrograph (SEM). Liquid crystal droplets were packed closely. The particle size of the liquid crystal droplets were within the range between 1.2–1.8 µm. The interstructure thickness of polymer matrix between the liquid crystal droplets was within the range between 0.3–0.45 µm.

Light-modulation properties as electro-optical properties in the direction perpendicular to the panel of the device were evaluated by means of LCD-5000 (made by Ootsuka Denshi K.K.) under such conditions as frequency of 30 Hz, light-receiving angle of 2.8° and temperature of 30° C. When no voltage was applied, the light-transmittance was represented by $T_0$ (%). As an applied voltage was increased, a maximal light-transmittance was obtained. The maximal light-transmittance was represented by $T_{max}$. As an alternating voltage of 30 Hz was represented as $V_{10}$ ($V_{rms}$) when light-transmittance of 10% was obtained, provided that $T_0$ was regarded as 0% and $T_{max}$ as 100%. Similarly an alternating voltage was represented as $V_{90}$ ($V_{rms}$) when light-transmittance of 90% was obtained. Contrast (CR) was calculated from the following formula:

$$CR=T_{max}/T_0$$

The results were as follows; $T_0$=0.9%, $T_{max}$= 83.2%, $V_{10}$=4.6 V, $V_{90}$=6.8 V, CR=92.

In this way, higher light-shuttering properties and lower driving voltage than that which had previously been obtained could be achieved.

A liquid crystal material of fluorine series which could not be used because of its small difference of refractive indexes in a liquid crystal device of polymer-dispersion type could be used.

Comparative Example 1

In Example 1, ultraviolet rays were applied while a temperature of 94° C. was maintained. That is, temperature was not lowered for light-irradiation to a degree such that liquid crystal phase and isotropic liquid phase were present in mixed conditions. Liquid crystal was in continuous states. Light-scattering properties were poor as shown below;

$T_0$=24.3%, $T_{max}$=83.3%.

Comparative Example 2

The same materials as used in Example 1 were used. But the component ratio was not same and the interstructure between liquid crystal droplets was larger than that in the Example 1.

In embodiment, a photopolymerizable material comprising 2-ethylhexyl acrylate (made by Nakarai Tesuku K.K.) as a monomer of 10 wt %, Biscoat #3700 (made by Osaka Yuuki Kagaku Kogyo K.K.) as an oligomer of 24.3 wt % and Darocur1173 (made by Merck K.K.) as a light-curable initiator of 0.7 wt %, and ZLI4792 (N-I point=92° C., $n_e$=1.573, $n_o$=1.479) (made by Merck Japan K.K.) as a liquid crystal material of 65.0 wt % were mixed to prepare a composition. A liquid crystal device having a cell gap of 13 µm was prepared by use of the composition in a manner similar to Example 1.

A sectional structure of the obtained device was observed by a scanning electron micrograph (SEM), with the result that the particle size of the liquid crystal droplets were within the range between 0.9–2.0 and that the interstructure thickness of polymer matrix between the liquid crystal droplets was within the range between 0.6–1.0 µm.

Electro-optical properties were measured according to Example 1 to show low contrast and high driving voltage compared to those of Example.

$T_0$=4.0%, $T_{max}$=83.2%, $V_{10}$=8.5 V, $V_{90}$=18.5 V, CR=21.

EXAMPLE 2

This example was carried out in a manner similar to Example 1. A photopolymerizable material with 9 cp at 20° C. comprising Loctite 352A (containing monomers and oligomers) as a prepolymer (made by Nippon Loctite K.K.)

of 4.2 wt % and 2-ethylhexyl acrylate (made by Nakarai Tesuku K.K.) as a monomer of 12.3 wt %, and ZLI4792 (N-I point=92° C., $n_e$=1.573, $n_o$=1.479) (made by Merck Japan K.K.) as a liquid crystal material of 83.5 wt % were mixed to prepare a composition.

The composition was poured into the space formed with a spacer of 13.0 μm thickness interposed between a pair of glass substrates the whole surface of which was coated with ITO electrode. Temperature was kept at 94° C. to compatibilize the composition completely. After a check of no presence of irregularities on the substrates, temperature was lowered to 59° C. at a speed of 5° C./min. The temperature was maintained. This state was kept for 1 minute. Then ultraviolet rays were applied (57 mW/cm², 5 seconds).

The thus prepared device had no bubbles. Light rays scattered uniformly all over the device. When alternating voltage of 30 Hz; 7 V was applied to the device, all the surface became in light-transmittable state. Light-transmittable state and light-scattering state could be controlled by turning-on and turning-off of voltage.

The observation of inside structure of the device by SEM gave a particle size of liquid crystal droplets within the range between 1.0–1.6 μm and an interstructure thickness of polymer matrix between the liquid crystal droplets within the range between 0.3–0.5 μm. The electro-optical properties were as follows;

$T_0$=1.2%, $T_{max}$=84.0%, $V_{10}$=4.3 V, $V_{90}$=6.2 V, CR=70.

Comparative Example 3

A liquid crystal device was prepared in a manner similar to Example 2, except that ultraviolet rays were applied while temperature of 94° C. was maintained.

Almost no light rays scattered. The structure of the device of the present invention could not be formed.

$T_0$=33.6%, $T_{max}$=83.7%

EXAMPLE 3

A liquid crystal device was prepared in a manner similar to Example 1, except that Irgacure 651 (made by Nippon Chibagaigi K.K.) containing benzyl dimethyl ketal was used as a photo-setting initiator instead of Darocur 1173.

That is, a photopolymerizable material with 3 cp at 20° C. comprising 2-ethylhexyl acrylate (made by Nakarai Tesuku K.K.) as a monomer of 7.41 wt %, Biscoat #3700 (made by Osaka Yuuki Kagaku Kogyo K.K.) as an oligomer of 11.21 wt % and Irgacure 651 (made by Nippon Chibagaigi K.K.) as a photosetting initiator of 0.38 wt %, and ZLI4792 (N-I point=92° C., $n_e$=1.573, $n_o$=1.479) (made by Merck Japan K.K.) as a liquid crystal material of 81.0 wt % were mixed to prepare a composition.

The composition was poured into the space formed with a spacer of 13.0 μm thickness interposed between a pair of glass substrates the whole surface of which was coated with ITO electrode. Temperature was kept at 94° C. to compatibilize the composition completely between the substrates. After a check of no presence of irregularities on the substrates, temperature was lowered to 61° C. at a speed of 6° C./min. The temperature was maintained. This state was kept for 1 minute. Then ultraviolet rays were applied (57 mW/cm², 5 seconds).

The observation of inside structure of the device by SEM gave a particle size of liquid crystal droplets within the range between 1.2–1.6 μm and an interstructure thickness of polymer matrix between the liquid crystal droplets within the range between 0.3–0.4 μm.

The electro-optical properties were as follows;

$T_0$=1.0%, $T_{max}$=83.1%, $V_{10}$=4.7 V, $V_{90}$=6.8 V, CR=83.

Comparative Example 4

A liquid crystal device was prepared in a manner similar to Example 3, except that ultraviolet rays were applied while temperature of 94° C. was maintained in Example 3.

Almost no light rays scattered as observed in Comparative Examples 1 and 2. The structure of a device of the present invention could not be formed.

$T_0$=22.6%, $T_{max}$=83.7%

EXAMPLE 4

A same composition as that in Example 1 was used. That is, 2-ethylhexyl acrylate (made by Nakarai Tesuku K.K.) as a monomer of 7.41 wt %, Biscoat #3700 (made by Osaka Yuuki Kagaku Kogyo K.K.) as an oligomer of 11.21 wt % and Darocur 1173 (made by Merck K.K.) as a photosetting initiator of 0.38 wt % and ZLI4792 (N-I point=92° C., $n_e$=1.573, $n_o$=1.479) (made by Merck Japan K.K.) as a liquid crystal material of 81.0 wt % were mixed to be provided for the following processes.

The composition was poured into the space formed with a spacer of 13.0 μm thickness interposed between a pair of glass substrates the whole surface of which was coated with ITO electrode. Temperature was kept at 94° C. to compatibilize the composition completely between the substrates. After a check for no presence of irregularities on the substrates, the temperature was lowered to 61° C. at a speed of 6° C./min. The temperature was maintained. This state was kept for 1 minute. Then ultraviolet rays were applied (0.7 mW/cm², 2 seconds). After interval of 1 second, ultraviolet rays were applied (11 mW/cm² 6.5 seconds)

Thus obtained device had the following properties. Partially distorted structure was found in the observation of inside structure of the device by SEM. A particle size of liquid crystal droplets was within the range between 0.8–1.8 μm and an interstructure thickness of polymer matrix between the liquid crystal droplets within the range between 0.1–0.4 μm.

$T_0$=0.7%, $T_{max}$=83.4%, $V_{10}$=4.7 V, $V_{90}$=6.9 V, CR=119.

EXAMPLE 5

The same composition as that in Example 2 was used. A liquid crystal device was prepared in a manner similar to that in Example 4.

That is, Loctite 352A as a prepolymer (made by Nippon Loctite K.K.) of 4.2 wt % and 2-ethylhexyl acrylate (made by Nakarai Tesuku K.K.) as a monomer of 12.3 wt %, and ZLI4792 (N-I point=92° C., $n_e$=1.573, $n_o$=1.479) (made by Merck Japan K.K.) as a liquid crystal material of 83.5 wt % were mixed to prepare a composition.

The composition was poured into the space formed with a spacer of 13.0 μm thickness interposed between a pair of glass substrates the whole surface of which was coated with ITO electrode. Temperature was kept at 94° C. to compatibilize the composition completely between the substrates. After a check of no presence of irregularities on the substrates, temperature was lowered to 59° C. at a speed of 5° C./min. The temperature was maintained. This state was kept for 1 minute. Then ultraviolet rays were applied (0.7 mW/cm², 2 seconds) After interval of 1 second, ultraviolet rays were applied (11 mW/cm², 6.5 seconds).

Partially distorted structure was also found in the observation of inside structure of the device by SEM. A particle size of liquid crystal droplets was within the range between 0.9–1.4 μm and an interstructure thickness of polymer matrix between the liquid crystal droplets was within the range between 0.3–0.4 μm.

$T_0$=0.75%, $T_{max}$=83.7%, $V_{10}$=4.5 V, $V_{90}$=6.4 V, CR=112.

EXAMPLE 6

The same composition as that in Example 3 was used. A liquid crystal device was prepared in a manner similar to that in Example 4.

That is, 2-ethylhexyl acrylate (made by Nakarai Tesuku K.K.) as a monomer of 7.41 wt %, Biscoat #3700 (made by Osaka Yuuki Kagaku Kogyo K.K.) as an oligomer of 11.21 wt % and Irgacure 651 (made by Nippon Chibagaigi K.K.) as a photosetting initiator of 0.38 wt % and ZLI4792 (N-I point=92° C., $n_e$=1.573, $n_o$=1.479) (made by Merck Japan K.K.) as a liquid crystal material of 81.0 wt % were mixed to prepare a composition.

The composition was poured into the space formed with a spacer of 13.0 μm thickness interposed between a pair of glass substrates the whole surface of which was coated with ITO electrode. Temperature was kept at 94° C. to compatibilize the composition completely between the substrates. After a check of no presence of irregularities on the substrates, temperature was lowered to 61° C. at a speed of 6° C./min. The temperature was maintained. This state was kept for 1 minute. Then ultraviolet rays were applied (0.7 mW/cm², 2 seconds). After interval of 1 second, ultraviolet rays were applied (11 mW/cm², 6.5 seconds).

Partially distorted structure was also found in the observation of inside structure of the device by SEM. A particle size of liquid crystal droplets was within the range between 0.5–1.7 μm and an interstructure thickness of polymer matrix between the liquid crystal droplets was within the range between 0.1–0.3 μm. The results of opto-electrical properties were as follows;

$T_0$=0.6%, $T_{max}$=84.0%, $V_{10}$=5.1 V, $V_{90}$=6.9 V, CR=140.

In Examples 1–6 and Comparative Examples 1–3, temperature was maintained at 94° C. in order to keep isotropic the phase of liquid crystal materials. A temperature much higher than N-I point (92° C.) of liquid crystal ZLI4792 may be adopted so far as substrates are not damaged, a composition is not vaporized or boiled, and safety is secured. In practice, a temperature between higher than 92° C. and lower than 105° C. could give the same results.

EXAMPLE 7

A gap was formed with a spacer of 13.0 μm thickness interposed between a pair of glass substrates the whole surface of which was coated with an ITO electrode. The substrates were bonded with a sealer except for a bung hole to give an empty cell.

The photopolymerizable material of Example 7 (2-ethylhexyl acrylate (made by Nakarai Tesuku K.K.) of 7.41 wt %, Biscoat #3700 (made by Osaka Yuuki Kagaku Kogyo K.K.) of 11.21 wt % and Darocur1173 (made by Merck K.K.) as a photosetting initiator of 0.38 wt %), and E-8 (containing liquid crystals of cyano series) (N-I point=72° C., $n_e$=1.771, $n_o$=1.525) (made by BDH K.K.) as a liquid crystal material of 81.0 wt % were mixed and stirred at 40° C. to be in a transparent state. This transparent composition was poured into the above empty cell and irradiated with ultraviolet rays (57 mW/cm², 5 seconds).

An inside structure of the obtained device was observed by SEM. Liquid crystal droplets each of which had almost same shape were packed closely. The particle size of almost all liquid crystal droplets were 1 μm. The interstructure thickness of polymer matrix between the liquid crystal droplets was about 0.3 μm.

The opto-electrical properties were as follows;

$T_0$=0.45%, $T_{max}$=84.0%, $V_{10}$=8.7 V, $V_{90}$=11.6 V, CR=187.

EXAMPLE 8

A cell was prepared in a manner similar to Example 7. That is, a gap was formed with a spacer of 13.0 μm thickness interposed between a pair of glass substrates the whole surface of which was coated with ITO electrode. The substrates were bonded with a sealer except for a bung hole to give an empty cell.

The photopolymerizable material of Example 1 (2-ethylhexyl acrylate (made by Nakarai Tesuku K.K.) as a monomer of 7.41 wt %, Biscoat #3700 (made by Osaka Yuuki Kagaku Kogyo K.K.) as an oligomer of 11.21 wt % and Darocur 1173 (made by Merck K.K.) as a photosetting initiator of 0.38 wt %), and BL035 (containing liquid crystals of cyano series) (N-I point=96° C., $n_e$=1.795, $n_o$=1.528) (made by Merck Japan K.K.) as a liquid crystal material of 81.0 wt % were mixed and stirred at 40° C. to be in a transparent state. This transparent composition was poured into the above empty cell and then irradiated with ultraviolet rays (57 mW/cm², 5 seconds).

An inside structure of the obtained device was observed by SEM. Liquid crystal droplets were packed very closely. The particle size of liquid crystal droplets was within the range between 0.7–1.2 μm. The interstructure thickness of polymer matrix between the liquid crystal droplets was within the range between 0.2–0.3 μm.

The opto-electrical properties were as follows;

$T_0$=0.52%, $T_{max}$=83.7%, $V_{10}$=8.9 V, $V_{90}$=12.1 V, CR=161.

A compatible temperature of the composition of Example 8 is about 39° C. Similar results can be obtained between a temperature higher than the compatible temperature and a temperature lower than the N-I point of the liquid crystal material.

EXAMPLE 9

A cell was prepared in a manner similar to Example 7.

The photopolymerizable material of Example 1 (2-ethylhexyl acrylate (made by Nakarai Tesuku K.K.) of 7.41 wt %, Biscoat #3700 (made by Osaka Yuuki Kagaku Kogyo K.K.) of 11.21 wt % and Darocur1173 (made by Merck K.K.) of 0.38 wt %), and TL202 (containg chlorine series) (N-I point=83° C., $n_e$=1.708, $n_o$=1.523) (made by Merck Japan K.K.) as a liquid crystal material of 81.0 wt % were mixed and stirred at 50° C. to be in a transparent state. This transparent composition was poured into the above empty cell and then irradiated with ultraviolet rays (57 mW/cm², 5 seconds).

An inside structure of the obtained device was observed by SEM. Liquid crystal droplets were packed very closely. The particle size of liquid crystal droplets was within the range between 0.8–1.7 μm. The interstructure thickness of polymer matrix between the liquid crystal droplets was within the range between 0.3–0.45 μm.

The opto-electrical properties were as follows; $T_0=0.44\%$, $T_{max}=83.8\%$, $V_{10}=7.8$ V, $V_{90}=10.1$ V, CR=190.

A compatible temperature of the composition of Example 9 is about 32° C. Similar results can be obtained between a temperature higher than the compatible temperature and a temperature lower than the N-I point of the liquid crystal material.

EXAMPLE 10

The photopolymerizable material of Example 2 and E-8 (N-I point=72° C., $n_e$=1.771, $n_o$=1.525) (made by BDH K.K.) as a liquid crystal material of 83.5 wt % were mixed and stirred at 50° C. to be in a transparent state. This transparent composition was poured into the same empty cell as prepared in Example 7 and then irradiated with ultraviolet rays (57 mW/cm$^2$, 5 seconds).

An inside structure of the obtained device was observed by SEM. Liquid crystal droplets were packed very closely. The particle size of liquid crystal droplets was within the range between 0.77–1.65 μm. The interstructure thickness of polymer matrix between the liquid crystal droplets was within the range between 0.3–0.45 μm.

The opto-electrical properties were as follows; $T_0=0.41\%$, $T_{max}=84.1\%$, $V_{10}=8.8$ V, $V_{90}=11.5$ V, CR=205.

EXAMPLE 11

The photopolymerizable material of Example 2 and BL035 (N-I point=96° C., $n_e$=1.795, $n_o$=1.528) (made by Merck Japan K.K. ) as a liquid crystal material of 83.5 wt % were mixed and stirred at 50° C. to be in a transparent state. This transparent composition was poured into the same empty cell as prepared in Example 7 and then irradiated with ultraviolet rays (57 mW/cm$^2$, 5 seconds ).

An inside structure of the obtained device was observed by SEM. Liquid crystal droplets were packed very closely. The particle size of liquid crystal droplets was within the range between 0.85–1.55 μm. The interstructure thickness of polymer matrix between the liquid crystal droplets was within the range between 0.3–0.5 μm.

The opto-electrical properties were as follows;

$T_0=0.49\%$, $T_{max}=84.0\%$, $V_{10}=8.3$ V, $V_{90}=11.2$ V, CR= 171.

The compatible temperature of the composition of Example 11 is about 46° C. Similar results can be obtained between a temperature higher than the compatible temperature and a temperature lower than the N-I point of the liquid crystal material.

EXAMPLE 12

The photopolymerizable material of Example 2 and TL202 (N-I point=83° C., $n_e$=1.708, $n_o$=1.523) (made by Merck Japan) as a liquid crystal material of 83.5 wt % were mixed and stirred at 50° C. to be in a transparent state. This transparent composition was poured into the same empty cell as prepared in Example 7 and then irradiated with ultraviolet rays (57 mW/cm$^2$, 5 seconds).

An inside structure of the obtained device was observed by SEM. Liquid crystal droplets were packed very closely. The particle size of liquid crystal droplets was within the range between 0.9–1.5 μm. The interstructure thickness of polymer matrix between the liquid crystal droplets was within the range between 0.3–0.5 μm.

The opto-electrical properties were as follows;

$T_0=0.46\%$, $T_{max}=83.8\%$, $V_{10}=7.9$ V, $V_{90}=10.8$ V, CR=182.

A compatible temperature of the composition of Example 12 is about 42° C. Similar results can be obtained between a temperature higher than the compatible temperature and a temperature lower than the N-I point of the liquid crystal material.

EXAMPLE 13

The photopolymerizable material of Example 3 and E-8 (N-I point=72° C., $n_e$=1.771, $n_o$=1.525) (made by BDH K.K.) as a liquid crystal material of 81.0 wt % were mixed and stirred at 50° C. to be in a transparent state. This transparent composition was poured into the same empty cell as prepared in Example 7 and then irradiated with ultraviolet rays (57 mW/cm$^2$, 5 seconds).

An inside structure of the obtained device was observed by SEM. Liquid crystal droplets were observed to be packed very closely. The particle size of almost liquid crystal droplets was 0.8 μm. The interstructure thickness of polymer matrix between the liquid crystal droplets was 0.2 μm.

The opto-electrical properties were as follows;

$T_0=0.28\%$, $T_{max}=84.0\%$, $V_{10}=8.9$ V, $V_{90}=12.4$ V, CR= 300.

EXAMPLE 14

The photopolymerizable material of Example 3 and BL035 (N-I point=96° C., $n_e$=1.795, $n_o$=1.528) (made by Merck Japan K.K.) as a liquid crystal material of 81.0 wt % were mixed and stirred at 40° C. to be in a transparent state. This transparent composition was poured into the same empty cell as prepared in Example 7 and then irradiated with ultraviolet rays (57 mW/cm$^2$, 5 seconds).

An inside structure of the obtained device was observed by SEM. Liquid crystal droplets were observed to be packed very closely. The particle size of almost liquid crystal droplets was 0.7 μm. The interstructure thickness of polymer matrix between the liquid crystal droplets was within the range between 0.2–0.35 μm.

The opto-electrical properties were as follows;

$T_0=0.24\%$, $T_{max}=84.0\%$, $V_{10}=8.7$ V, $V_{90}=12.0$ V, CR=350.

A compatible temperature of the composition of Example 14 is about 40° C. Similar results can be obtained between a temperature higher than the compatible temperature and a temperature lower than the N-I point of the liquid crystal material.

EXAMPLE 15

The photopolymerizable material of Example 3 and TL202 (N-I point=83° C., $n_e$=1.708, $n_o$=1.523) (made by Merck Japan K.K.) as a liquid crystal material of 81.0 wt % were mixed and stirred at 50° C. to be in a transparent state. This transparent composition was poured into the same empty cell as prepared in Example 7 and then irradiated with ultraviolet rays (57 mW/cm$^2$, 5 seconds).

An inside structure of the obtained device was observed by SEM. Liquid crystal droplets were observed to be packed very closely. The particle size of liquid crystal droplets was within the range between 1.1–1.3 μm. The interstructure thickness of polymer matrix between the liquid crystal droplets was within the range between 0.2–0.4 μm.

The opto-electrical properties were as follows;

$T_0$=0.25%, $T_{max}$=83.8%, $V_{10}$=7.9 V, $V_{90}$=11.4 V, CR=335.

A compatible temperature of the composition of Example 15 is about 33° C. Similar results can be obtained between a temperature higher than the compatible temperature and a temperature lower than the N-I point of the liquid crystal material.

EXAMPLE 16

2-ethylhexyl acrylate (made by Nakarai Tesuku K.K.) as a monomer of 7.41 wt %, HX620 (made by Nippon Kayaku K.K.) as polyfunctional acrylate of 11.21 wt % and Darocur1173 (made by Merck K.K.) as a light-curable initiator of 0.38 wt % were mixed to prepare a photopolymerizable material having a viscosity of 2 cp at 20° C. This photopolymerizable material and ZLI4792 (N-I point=92° C., $n_e$=1.573, $n_o$=1.479) (made by Merck Japan K.K.) as a liquid crystal material of 81.0 wt % were mixed and stirred at 70° C. to be in a transparent state. This transparent composition was poured into the same empty cell as prepared in Example 7. Then temperature was lowered to 58° C. at a speed of 6° C./min. The temperature was maintained. This state was kept for 1 minute Then ultraviolet rays were applied (57 mW/cm², 5 seconds).

An inside structure of the obtained device was observed by SEM. Liquid crystal droplets were observed to be packed very closely. The particle size of liquid crystal droplets was within the range between 1.0–1.4 μm. The interstructure thickness of polymer matrix between the liquid crystal droplets was within the range between 0.2–0.3 μm.

The opto-electrical properties were as follows;

$T_0$=0.68%, $T_{max}$=84.1%, $V_{10}$=5.8 V, $V_{90}$=7.2 V, CR=124.

The lowering speed of the temperature is not limited to that in this Example. A compatible the temperature of the composition of Example 16 is about 60° C. Similar results can be obtained when a stirring and mixing process is carried out between a temperature higher than the compatible temperature and a temperature lower than the N-I point of the liquid crystal material and the temperature is lowered to 60° C. or less so that a liquid crystal phase and an isotropic liquid phase may be present at the same time.

EXAMPLE 17

A viscosity of a photopolymerizable material comprising oligoester acrylate:M5500 (made by Toa Gosei K.K.) of 2.7 wt %, 2-ethylhexyl acrylate (made by Nakarai Tesuku K.K.) as a monomer of 13.5 wt % and Irgacure 651 as a photosetting initiator of 0.3 wt % was measured at 20° C. to give 4 cp. This photopolymerizable material was mixed and stirred at 70° C. with ZLI4792 (N-I point=92° C., $n_e$=1.573, $n_o$=1.479) (made by Merck Japan K.K.) as a liquid crystal material of 83.5 wt % so that the mixture might be in a transparent state. This transparent composition was poured into the same empty cell as prepared in Example 7. Then the temperature was lowered to 59° C. at a speed of 5° C./min. The temperature was maintained. This state was kept for 1 minute. Then ultraviolet rays were applied (57 mW/cm², 5 seconds).

An inside structure of the obtained device was observed by SEM. Liquid crystal droplets were observed to be packed very closely. The particle size of liquid crystal droplets was within the range between 0.8–1.5 μm. The interstructure thickness of polymer matrix between the liquid crystal droplets was within the range between 0.1–0.4 μm.

The opto-electrical properties were as follows;

$T_0$=0.74%, $T_{max}$=83.9%, $V_{10}$=5.9 V, $V_{90}$=7.4 V, CR= 113.

The lowering speed of the temperature is not limited to that in this Example. A compatible temperature of the composition of Example 17 is about 63° C. Similar results can be obtained when a stirring and mixing process is carried out between a temperature higher than the compatible temperature and a temperature lower than the N-I point of the liquid crystal material and the temperature is lowered to 63° C. or less so that a liquid crystal phase and an isotropic liquid phase may be present at the same time.

EXAMPLE 18

2-butoxyethyl acrylate as a monomer of 8.41 wt %, Biscoat #3700 (made by Osaka Yuki Kagaku Kogyo K.K.) as an oligomer of 10.21 wt % and Irgacure 651 as a photosetting initiator of 0.38 wt % were mixed to give a photopolymerizable material having a viscosity of 5 cp at 20° C. This photopolymerizable material was mixed and stirred at 70° C. with ZLI4792 (N-I point=92° C., $n_e$=1.573, $n_o$=1.479) (made by Merck Japan K.K.) as a liquid crystal material of 81.0 wt % so that the mixture might be in a transparent state. This transparent composition was poured into the same empty cell as prepared in Example 7. Then the temperature was lowered to 60° C. at a speed of 6° C./min. The, temperature was maintained. This state was kept for 1 minute. Then ultraviolet rays were applied (57 mW/cm², 5 seconds).

An inside structure of the obtained device was observed by SEM. Liquid crystal droplets were observed to be packed very closely. The particle size of liquid crystal droplets was within the range between 0.5–1.75 μm. The interstructure thickness of polymer matrix between the liquid crystal droplets was within the range between 0.1–0.5 μm.

The opto-electrical properties were as follows;

$T_0$=0.87%, $T_{max}$=84.0%, $V_{10}$=5.2 V, $V_{90}$=6.9 V, CR=97.

The lowering speed of the temperature is not limited to that in this Example. A compatible temperature of the composition of Example 18 is about 61° C. Similar results can be obtained when a stirring and mixing process is carried out between a temperature higher than the compatible temperature and a temperature lower than the N-I point of the liquid crystal material and the temperature is lowered to 61° C. or less so that a liquid crystal phase and an isotropic liquid phase may be present at the same time.

EXAMPLE 19

2-ethylhexyl acrylate (made by Nakarai Tesuku K.K.) as a monomer of 7.41 wt %, Biscoat #3700 (made by Osaka Yuuki Kagaku Kogyo K.K.) as an oligomer of 11.21 wt % and Darocur1173 (made by Merck K.K.) as a photosetting initiator of 0.38 wt %, and ZLI4792 (N-I point=92° C., $n_e$=1.573, $n_o$=1.479) (made by Merck Japan K.K.) as a liquid crystal material of 81.0 wt % were mixed and stirred at 70° C. to be in a transparent state. This transparent composition was poured into the same empty cell as prepared in Example 7. Then the temperature was lowered to 58° C. at a speed of 6° C./min. The temperature was maintained. This state was kept for 1 minute. Then ultraviolet rays were applied (0.7 mW/cm², 2 seconds). After interval of 1 second, ultraviolet rays were applied (11 mW/cm² 6.5 seconds).

An inside structure of the obtained device was observed by SEM. Liquid crystal droplets were observed to be packed very closely. The particle size of liquid crystal droplets was within the range between 0.5–1.75 μm. The interstructure thickness of polymer matrix between the liquid crystal droplets was within the range between 0.1–0.5 μm.

The opto-electrical properties were as follows;

$T_0$=0.29%, $T_{max}$=84.0%, $V_{10}$=5.4 V, $V_{90}$=7.2 V, CR= 290.

The lowering speed of temperature is not limited to that in this Example. A compatible temperature of the composition of Example 19 is about 60° C. Similar results can be obtained when a stirring and mixing process is carried out between a temperature higher than the compatible temperature and a temperature lower than the N-I point of the liquid crystal material and temperature is lowered to 60° C. or less so that a liquid crystal phase and an isotropic liquid phase may be present at the same time.

EXAMPLE 20

Loctite 352A as a prepolymer (made by Nippon Loctite K.K.) of 4.2 wt % and 2-ethylhexyl acrylate (made by Nakarai Tesuku K.K.) as a monomer of 12.3 wt % and ZLI4792 (N-I point=92° C., $n_e$=1.573, $n_o$=1.479) (made by Merck Japan K.K.) as a liquid crystal material of 83.5 wt % were mixed and stirred at 70° C. to be in a transparent state. This transparent composition was poured into the same empty cell as prepared in Example 7. Then temperature was lowered to 59° C. at a speed of 5° C/min. The temperature was maintained. This state was kept for 1 minute. Then ultraviolet rays were applied (0.7 mW/cm², 2 seconds). After interval of 1 second, ultraviolet rays were applied (11 mW/cm², 6.5 seconds).

An inside structure of the obtained device was observed by SEM. Liquid crystal droplets were observed to be packed very closely. The particle size of liquid crystal droplets was within the range between 0.6–1.55 μm. The interstructure thickness of polymer matrix between the liquid crystal droplets was within the range between 0.1–0.4 μm.

The opto-electrical properties were as follows;

$T_0$=0.53%, $T_{max}$=84.2%, $V_{10}$=5.6 V, $V_{90}$=7.5 V, CR=159.

The lowering speed of temperature change is not limited to that in this Example. A compatible temperature of the composition of Example 20 is about 63° C. Similar results can be obtained when a stirring and mixing process is carried out between a temperature higher than the compatible temperature and a temperature lower than the N-I point of the liquid crystal material and the temperature is lowered to 63° C. or less so that a liquid crystal phase and an isotropic liquid phase may be present at the same time.

EXAMPLE 21

2-ethylhexyl acrylate (made by Nakarai Tesuku K.K.) as a monomer of 7.41 wt %, Biscoat #3700 (made by Osaka Yuuki Kagaku Kogyo K.K.) as an oligomer of 11.21 wt % and Irgacure 651 (made by Nippon Chibagaigi K.K.) as a photosetting initiator of 0.38 wt %, and ZLI4792 (N-I point=92° C., $n_e$=1.573, $n_o$=1.479) (made by Merck Japan K.K.) as a liquid crystal material of 81.0 wt % were mixed and stirred at 70° C. to be in a transparent state. This transparent composition was poured into the same empty cell as prepared in Example 7. Then the temperature was lowered to 60° C. at a speed of 6° C./min. The temperature was maintained. This state was kept for 1 minute. Then ultraviolet rays were applied (0.7 mW/cm², 2 seconds). After interval of 1 second, ultraviolet rays were applied (11 mW/cm², 6.5 seconds).

An inside structure of the obtained device was observed by SEM. Liquid crystal droplets were observed to be packed very closely. The particle size of liquid crystal droplets was within the range between 0.8–1.35 μm. The interstructure thickness of polymer matrix between the liquid crystal droplets was within the range between 0.1–0.35 μm.

The opto-electrical properties were as follows;

$T_0$=0.27%, $T_{max}$=84.1%, $V_{10}$=5.3 V, $V_{90}$=7.1 V, CR= 311.

The lowering speed of temperature is not limited to that in this Example. A compatible temperature of the composition of Example 21 is about 61° C. Similar results can be obtained when a stirring and mixing process is carried out between a temperature higher than the compatible temperature and a temperature lower than the N-I point of the liquid crystal material and the temperature is lowered to 61° C. or less so that a liquid crystal phase and an isotropic liquid phase may be present at the same time.

EXAMPLE 22

2-ethylhexyl acrylate (made by Nakarai Tesuku K.K.) as a monomer of 14.88 wt %, Biscoat #3700 (made by Osaka Yuuki Kagaku Kogyo K.K.) as an oligomer of 8.74 wt % and Irgacure 651 (made by Nippon Chibagaigi K.K.) as a photosetting initiator of 0.38 wt %, and BL035 (N-I point= 96° C., $n_e$=1.795, $n_o$=1.528) (made by Merck Japan K.K.) as a liquid crystal material of 76.00 wt % were mixed and stirred at 56° C. to be in a transparent state. This transparent composition was poured into the same empty cell as prepared in Example 7. Then ultraviolet rays were applied (11 mW/cm², 8 seconds).

An inside structure of the obtained device was observed by SEM. Liquid crystal droplets were observed to be packed uniformly. The particle size of liquid crystal droplets was 0.6 μm. The interstructure thickness of polymer matrix between the liquid crystal droplets was 0.1 μm.

The opto-electrical properties were as follows;

$T_0$=0.27%, $T_{max}$=82.50%, $V_{10}$=9.4 V, $V_{90}$=12.9 V, CR= 305.

The intensity of ultraviolet rays are not limited to the ones shown in Examples 1–22. In fact, it has been verified that the use of ultraviolet rays of 3 mW/cm²–160 mW/cm² can provide a device having characteristics of the present invention. The thickness of the device is not limited to 13 μm. All the polymerizable materials shown in Examples had a viscosity between 2 cp–10 cp at 20° C.

In Examples 1–6 and 16–22, a left-standing process was taken for 1 minute before irradiation of ultraviolet rays. A left-standing process for 2 minutes gave similar results. However a left-standing process for 15 seconds could not effect sufficient reproducibility of characteristics.

When a mixing ratio of liquid crystal materials is as high as 70–90 wt % (which corresponds to 60–95 percents by volume), liquid crystal often forms continuous phases. In this case it is generally difficult to pack closely and separately liquid crystal droplets of particle size of 0.6–2 μm with thin interstructures of polymer matrix interposed between liquid crystal droplets. In the present invention, a viscosity of a photopolymerizable material which is mixed with liquid crystal materials is adjusted within a specified range and a specified production method is taken. Thereby it can be realized that liquid crystal droplets of 0.6–0.2 μm are dispersed closely with interstructures of thickness of 0.5 μm or less interposed between the liquid crystal droplets. A composite of polymer materials and liquid crystal materials effects both high scattering properties and low driving voltage according to the present invention.

A viscosity of a composition for polymer materials has great influence on constitution of a light-modulation layer. If the viscosity is lower than 2 cp, liquid crystal phases are continuous. If the viscosity is larger than 20 cp, a thickness of interstructure of polymer matrix is larger than 0.5 μm and a driving voltage becomes high.

If a content of liquid crystal materials is larger than 90 wt %, liquid crystal phases can not be separated out from polymeric materials, so that light rays do not scatter. If a content of liquid materials is lower than 70 wt %, interstructures become thick, the difference of refractive indexes between polymeric matrix and liquid crystal causes light-scattering. Therefore it is necessary that the refractive index of polymer matrix is made as same as that of liquid crystal. Moreover, the a driving voltage becomes high. A device desired according to the present invention can not be obtained.

Liquid crystal materials of cyano series having large an, which have been used in a conventional polymer-dispersion type, had problems such as poor light resistance. According to the present invention, liquid crystal materials having low Δn can be used, so that liquid crystal materials of fluorine series having high reliability can be also used.

What is claimed is:

1. A production method for a light-modulation element in which a liquid crystal material is mixed in an amount of 70 wt % to 90 wt % with a photopolymerizable material having a viscosity of 2 cp–10 cp at 20° C. while heating to such a temperature at which the liquid crystal material is transformed to an isotropic phase, the temperature is lowered to such a level at which the liquid crystal material shows both a liquid crystal phase and an isotropic phase, and then ultraviolet rays are applied to form a light-modulating layer.

2. The production method of a light-modulation element of claim 1, in which the photopolymerizable material comprises at least 2-ethylhexyl acrylate.

3. The production method of a light-modulation element of claim 1, in which the photopolymerizable material comprises at least benzyl dimethyl ketal.

4. The production method of a light-modulation element of claim 1, in which the liquid crystal material comprises a liquid crystal material of fluorine series.

5. The production method of a light-modulation element of claim 1, in which the irradiation process comprises;

the first irradiation process in which ultraviolet rays are applied at such a small irradiation quantity as the photopolymerizable material is not completely cured and the second irradiation process in which ultraviolet rays are applied at an irradiation quantity higher than that in the first irradiation process to polymerize the photopolymerizable material completely.

6. The production method of a light-modulation element of claim 5, in which the liquid crystal material is mixed with the photopolymerizable material to be contained at a content of 70 wt %–90 wt %.

7. The production method of a light-modulation element of claim 5, in which the photopolymerizable material comprises at least 2-ethylhexyl acrylate.

8. The production method of a light-modulation element of claim 5, in which the photopolymerizable material comprises at least benzyl dimethyl ketal.

9. The production method of a light-modulation element of claim 5, in which the liquid crystal material comprises a liquid crystal material of fluorine series.

10. The production method for a light-modulation element in which a photopolymerizable material having a viscosity of 2 cp–10 cp at 20° C. is mixed and stirred in an amount of 70 wt % to 90 wt % with a liquid crystal material at a temperature lower than a transition point of the liquid crystal material to an isotropic phase, a transparent solution is formed in a completely compatibilized state and then the transparent solution is irradiated for photo-polymerization with ultraviolet rays to separate out liquid crystal phases in a polymer matrix.

11. The production method of a light-modulation element of claim 10, in which the photopolymerizable material comprises at least 2-ethylhexyl acrylate.

12. The production method of a light-modulation element of claim 10 in which the photopolymerizable material comprises at least benzyl dimethyl ketal.

13. The production method of a light-modulation element of claim 10, in which the liquid crystal material comprises a liquid crystal material of fluorine series.

14. The production method of a light-modulation element in which a photopolymerizable material having a viscosity of 2 cp–10 cp at 20° C. is mixed and stirred with a liquid crystal material at a temperature lower than a transition point of the liquid crystal material to an isotropic phase to form a uniform solution, temperature is lowered so that both liquid crystal phases and isotropic phases may be present and then ultraviolet rays are applied.

15. The production method of a light-modulation element of claim 14, in which the liquid crystal material is mixed with the photopolymerizable material to be contained at a content of 70 wt %–90 wt %.

16. The production method of a light-modulation element of claim 14, in which the photopolymerizable material comprises at least 2-ethylhexyl acrylate.

17. The production method of a light-modulation element of claim 14, in which the photopolymerizable material comprises at least benzyl dimethyl ketal.

18. The production method of a light-modulation element of claim 14, in which the liquid crystal material comprises a liquid crystal material of fluorine series.

19. The production method of a light-modulation element of claim 18, in which the irradiation process comprises;

the first irradiation process in which ultraviolet rays are applied at such a small irradiation quantity as the photopolymerizable material is not completely cured and the second irradiation process in which ultraviolet rays are applied at an irradiation quantity higher than that in the first irradiation process to polymerize the photopolymerizable material completely.

20. The production method of a light-modulation element of claim 19, in which the liquid crystal material is mixed with the photopolymerizable material to be contained at a content of 70 wt %–90 wt %.

21. The production method of a light-modulation element of claim 19, in which the photopolymerizable material comprises at least 2-ethylhexyl acrylate.

22. The production method of a light-modulation element of claim 19, in which the photopolymerizable material comprises at least benzyl dimethyl ketal.

23. The production method of a light-modulation element of claim 19, in which the liquid crystal material comprises a liquid crystal material of fluorine series.

* * * * *